United States Patent [19]
Frison et al.

[11] Patent Number: 6,049,789
[45] Date of Patent: Apr. 11, 2000

[54] SOFTWARE PAY PER USE LICENSING SYSTEM

[75] Inventors: Michael R. Frison, Tualatin; Bela L. Kirchberger, McMinnville, both of Oreg.

[73] Assignee: Mentor Graphics Corporation, Wilsonville, Oreg.

[21] Appl. No.: 09/104,459

[22] Filed: Jun. 24, 1998

[51] Int. Cl.[7] ........................................... H04L 9/00
[52] U.S. Cl. ............................. 705/59; 705/57; 380/4
[58] Field of Search .................... 705/1, 57, 58, 705/59; 380/3, 4

[56] References Cited

U.S. PATENT DOCUMENTS

| | | | |
|---|---|---|---|
| 4,791,565 | 12/1988 | Dunham et al. | 713/200 |
| 4,796,181 | 1/1989 | Wiedemer | 380/4 |
| 5,353,219 | 10/1994 | Mueller et al. | 705/16 |
| 5,553,143 | 9/1996 | Ross et al. | 380/25 |
| 5,625,690 | 4/1997 | Michel et al. | 380/4 |
| 5,636,276 | 6/1997 | Brugger | 380/4 |
| 5,638,443 | 6/1997 | Stefik et al. | 380/4 |
| 5,638,513 | 6/1997 | Ananda | 713/202 |
| 5,671,412 | 9/1997 | Christiano | 707/104 |
| 5,673,315 | 9/1997 | Wolf | 380/4 |
| 5,745,879 | 4/1998 | Wyman | 705/1 |
| 5,758,068 | 5/1998 | Brandt et al. | 713/200 |
| 5,790,664 | 8/1998 | Coley et al. | 380/4 |
| 5,884,284 | 3/1999 | Peters et al. | 705/30 |
| 5,905,860 | 3/1999 | Olsen et al. | 380/4 |
| 5,930,357 | 7/1999 | Fukui | 380/4 |
| 5,935,249 | 8/1999 | Stern et al. | 713/201 |
| 5,940,504 | 8/1999 | Griswold | 380/4 |

FOREIGN PATENT DOCUMENTS

WO 93/01550  1/1993  WIPO.

*Primary Examiner*—James P. Trammell
*Assistant Examiner*—Nicholas David Rosen
*Attorney, Agent, or Firm*—Blakely Sokoloff Taylor & Zafman, LLP

[57] ABSTRACT

A software pay-per-use (PPU) licensing system is disclosed. The PPU licensing system includes one or more licensor license management system (LMS) and one or more licensee LMS. Each licensee LMS includes one or more components that operate to grant pay-per-use licenses for software applications, including data collection on amount of usage licenses granted, and to monitor operational states of the pay-per-use license granting and data collection operations, including periodic reporting of state and usage license granted data to a licensor LMS. Each licensor LMS includes components that operate to receive, store and process state and usage license granted data for the software applications from the licensee systems, including verification of timely periodic reporting from the licensee LMS.

27 Claims, 7 Drawing Sheets

SOFTWARE PAY PER USE LICENSING SYSTEM

BACKGROUND OF THE INVENTION

1. Field of the Invention

The present invention relates to the field of managing software licenses. More specifically, the present invention relates to a software pay per use licensing system.

2. Background Information

Many software are licensed on a machine by machine basis. In other words, each machine is provided with its own license. Once licensed, any number of users connected to the machine, directly or remotely, may execute one or more copies of the software on the machine. Other software are licensed on a user basis. That is, up a maximum of N users (where N is the number of licensed users) may execute one or more copies of the software on the machine at the same time. Numerous machine based as well as user based licensing systems are known in the art.

Recently, increasing number of software applications, e.g. electronic design automation (EDA) software, are interested in being licensed on a pay-per-use basis. Pay-per-use licensing system has at least the advantage of lower up front cost for the licensees, which in turn often leads to higher sales and greater revenue in the long run for the licensor. One such pay-per-use licensing system is disclosed in U.S. Pat. No. 5,625,690. Under the '690 approach, an encryption program is employed to encode the software using cryptographic techniques. In order to use the software, a user must call a telephone number to receive the cryptographic keys necessary to decrypt the encrypted software, thereby forcing the user to pay for each use. The approach suffers from at least the disadvantage of forcing the potential pay-per-use licensee to have to contact the licensor at the time of the desired usage, which may or may not be a convenient time for the user. The time incurred for the transfer of the cryptographic keys slows down the software's start up process, leading to a user perception of poor performance. Thus, in practice, the retrieval of the encrypted keys are often performed only once at the "first use". While this alternate practice improves user satisfaction, the practice compromises system integrity. Therefore, a more user friendly, and yet reasonably robust software pay-per-use licensing system is desired.

SUMMARY OF THE INVENTION

A software pay-per-use (PPU) licensing system is disclosed. The PPU licensing system includes one or more licensor license management systems (LMS) and one or more licensee LMS. Each licensee LMS includes one or more components that operate to grant pay-per-use licenses for software applications, including data collection on amount of usage licenses granted, and to monitor operational states of the pay-per-use license granting and data collection operations, including periodic reporting of state and usage license granted data to a licensor LMS. Each licensor LMS includes components that operate to receive, store and process state and usage license granted data for the software applications from the licensee systems, including verification of timely periodic reporting from the licensee LMS.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
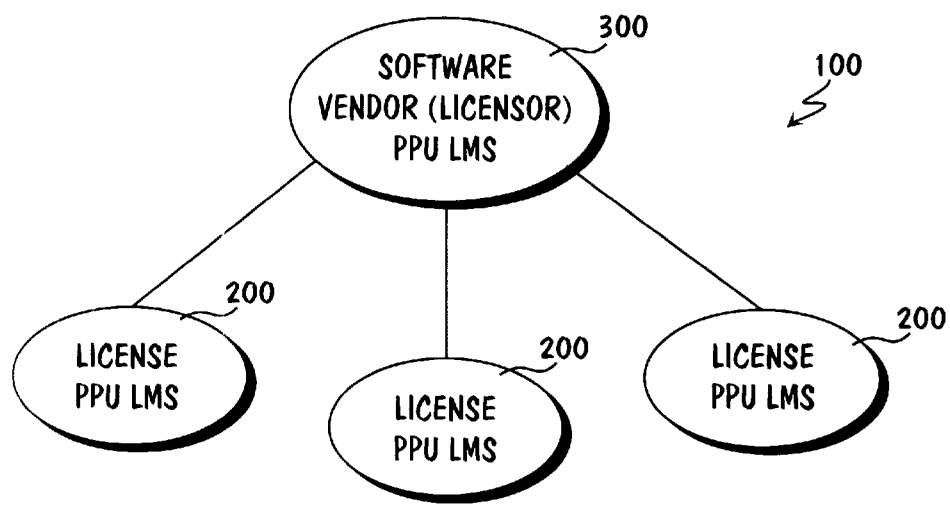
FIG. 1 illustrates an overview of the software pay-per-use licensing system of the present invention.

Referring now FIG. 1, wherein a block diagram illustrating an overview of the software PPU licensing system of the present invention is shown. As illustrated, in accordance with the present invention, software PPU licensing system 100 includes one or more licensor PPU license management system (LMS) 300 (one shown), and one or more licensee LMS 200, communicatively coupled to each other as shown. As will be described in more details below, each licensee LMS 200 includes one or more components that operate to grant pay-per-use licenses for software applications subject to PPU licensing, including data collection on amount of usage licenses granted, and to monitor operational states of the pay-per-use license granting and data collection operations, including periodic reporting of state and usage license granted data to a licensor LMS. Each licensor LMS 300 includes components that operate to receive, store and process state and usage license granted data for the software applications from the licensee systems, including verification of timely periodic reporting from the licensee LMS.

In one embodiment, each licensor PPU LMS 300 serves one software vendor; in other words, proprietary. In an alternate embodiment, each licensor PPU LMS 300 serves multiple software vendors, e.g. a publishing house. Whether it is vendor specific or publishing house, multiple licensor PPU LMS 300 may be employed with each licensor PPU LMS 300 managing a subset of the potential PPU licensees. In one embodiment, each licensee PPU LMS 200 serves one licensing domain of a licensee, which may include one or more client systems directly or remotely coupled to the licensee PPU LMS 200. One example of direct coupling is through a local area network. One example of remote coupling is through frame relay wide area networking. Similarly, each licensee PPU LMS 200 may be communicatively coupled to a licensor PPU LMS 300 in any one of a number of communication approaches known in the art, including but not limited to frame relay or the Internet.

Figure 2:
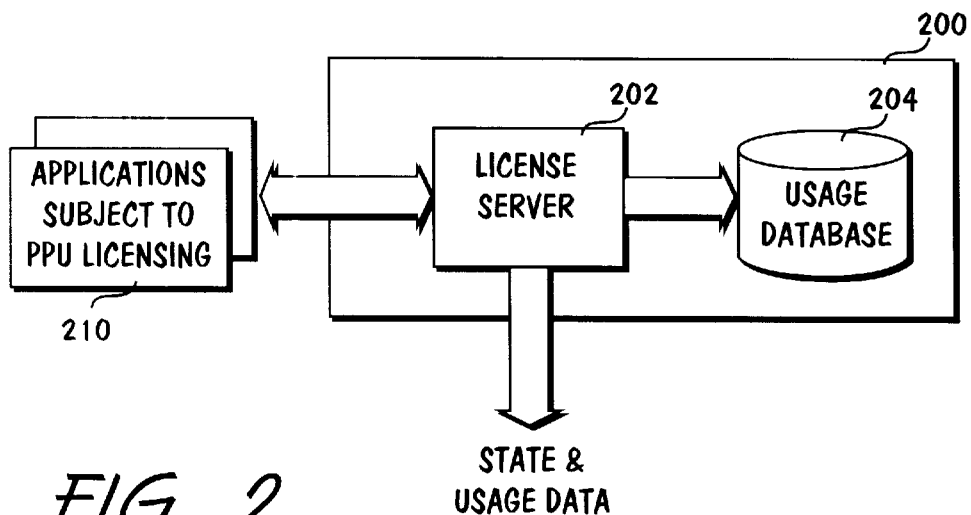
FIG. 2 illustrates one embodiment of a licensee LMS.

FIG. 2 illustrates one embodiment of a licensee PPU LMS 200. As shown, for the illustrated embodiment, licensee PPU LMS 300 includes license server 202 and usage database 204. Usage database 204 operates to store PPU license granted data. License server 202 operates to grant PPU licenses to applications subject to PPU licensing 210, and to collect usage license granted data, for storage in usage database 204. License server 202 also operates to send state and usage data to a licensor LMS periodically, in accordance with a predetermined schedule expected by the licensor LMS.

In one embodiment, licenser server 202 grants a PPU license to an application subject to PPU licensing 210, responsive to a PPU license grant request received from the application. An application 210 submits the license grant request responsive to user invocation of the application. The application will not operate unless a PPU license is granted.

Figure 3:
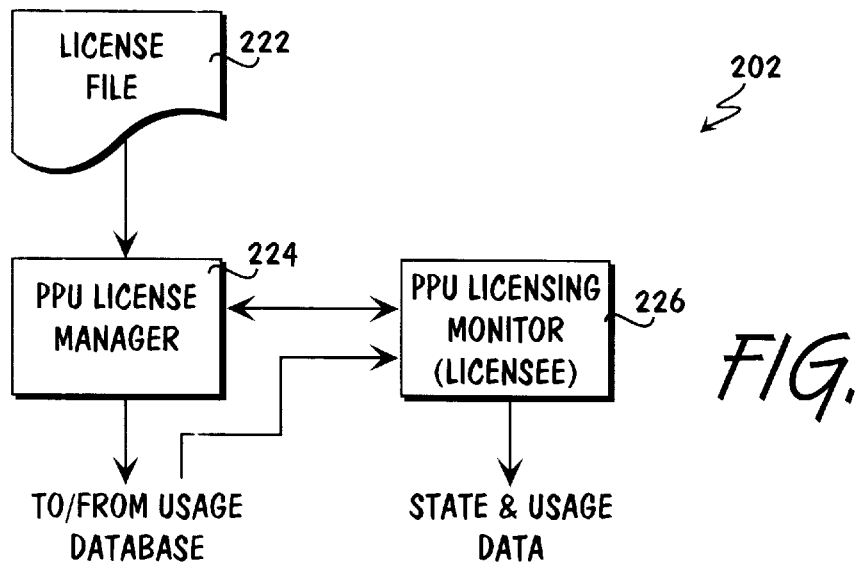
FIG. 3 illustrates one embodiment of the license server of FIG. 2.
Figure 4:
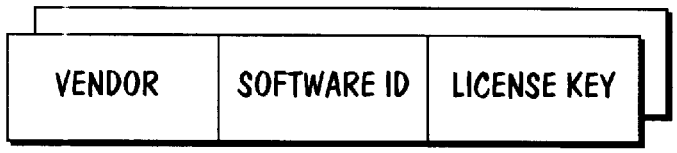
FIG. 4 illustrates one embodiment of the license information maintained in the license file of FIG. 3.

FIG. 3 illustrates one embodiment of license server 202. As shown, for the illustrated embodiment, license server 202 includes license file 222, PPU license manager 224 and PPU licensing monitor 226. In one embodiment, license file 222 operates to hold information regarding the licensors, the applications that are subject to PPU licensing, and the keys that enable the applications to function. An example of such license file with the information organized into vendor and application records is shown in FIG. 4. PPU license manager 224 grants a PPU license to an application responsive to the application's request, as described earlier, in accordance with the information stored in license file 222.

Figure 5:
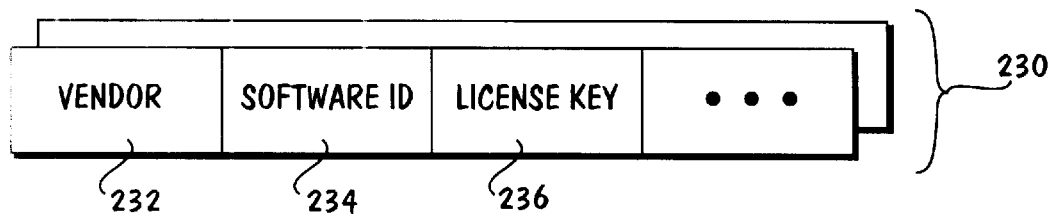
FIG. 5 illustrates one embodiment of the usage data of FIG. 3.

Skipping now to FIG. 5, wherein one embodiment of the usage data stored in usage database 204 is illustrated. As shown, for the illustrated embodiment, the usage data are stored as usage records 230. Each usage record 230 includes vendor identification 232 identifying the vendor, software identification 234 identifying the software application of the vendor involved in the PPU licensing transaction, and the amount of usage licensed 236. In one embodiment, the usage is licensed in seconds. Additionally, in other embodiments, each usage record 230 also includes other information such as the date, time, host, user and features of the software application involved in the PPU licensing transaction. Beside the basic information such as the amount of usage licensed, the precise nature of the data stored in each usage record 230 is application dependent. Those skilled in the art will appreciate that the present invention may be practiced with more or less data stored in each usage record 230.

Referring now back to FIG. 3, PPU licensing monitor 226 operates to monitor the PPU license granting process, ensuring periodically that license file 222 and license manager 224 are in proper operational state. Such periodical checking may be accomplished in any one of a number of techniques known in the art. Additionally, PPU licensing monitor 226 operates to periodically send state and usage data to a licensor system. In one embodiment, the state data includes data denoting that the proper operation of the PPU license granting process is being monitored. In another embodiment, the state data also includes errors noted by PPU licensing monitor 226.

Figure 6:
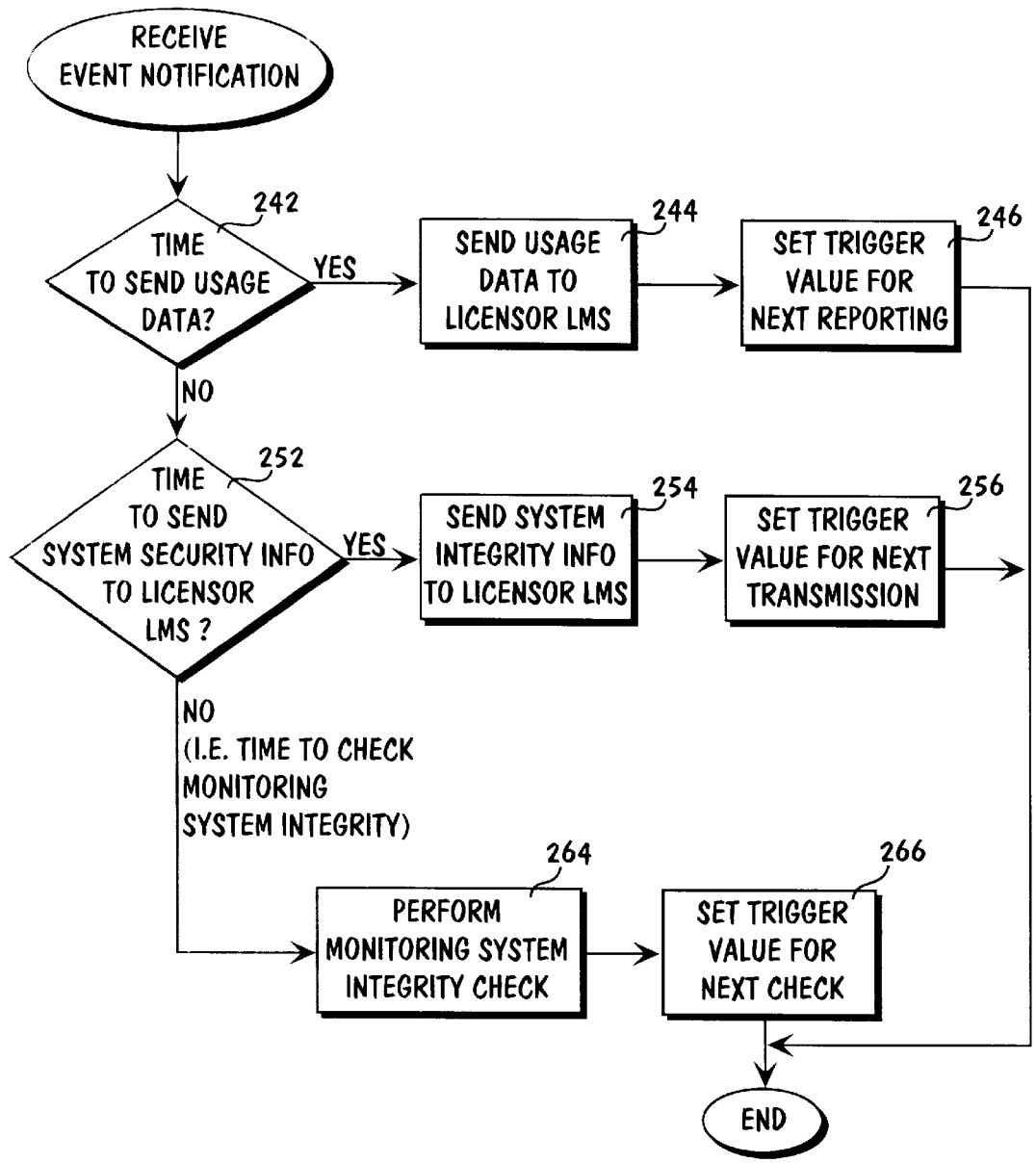
FIG. 6 illustrates one embodiment of the operational flow of the PPU licensing monitor of FIG. 3.

FIG. 6 illustrates one embodiment of the operational flow of PPU licensing monitor 226. As illustrated, upon receipt of an event notification (explained in more details below), PPU licensing monitor 226 determines the nature of the event, steps 242 and 252. At step 242 PPU licensing monitor 226 determines if it is time to send usage data. If it is time to send usage data, PPU licensing monitor 226 sends the usage and/or error data to the licensor LMS, step 244. Upon finished sending the usage and/or error data, PPU licensing monitor 226 sets a new trigger value, e.g. day, hour, and/or minute, for triggering the next "data sending" notification, step 246. In one embodiment, PPU licensing monitor 226 sets the trigger value to the same date next month to allow usage data to be sent to a licensor LMS once a month.

If it is not time to send usage data, PPU licensing monitor 226 determines if it is time to send system integrity information to a licensor LMS (also referred to as "checking in with the licensor LMS"), that is to provide data to the licensor LMS denoting that the PPU licensing process is indeed being monitored for proper operation, step 252. If it is time to "check in" with the licensor LMS, PPU licensing monitor 226 sends the "check-in" data to the licensor LMS, step 254. In one embodiment, the "check-in" data is in the form of an email. Upon finished "checking in", PPU licensing monitor 226 sets a new trigger value, e.g. day, hour, and/or minute, for triggering the next "check in" notification, step 256. In one embodiment, PPU licensing monitor 226 sets the trigger value to twelve hours later, to allow "check in" with a licensor LMS to be performed twice per day.

If it is not time to "check in" with a licensor LMS, for the illustrated embodiment, it is time to check the monitoring system's integrity. Accordingly, PPU licensing monitor 226 checks the monitoring system's integrity. PPU licensing monitor 226 checks to ensure licensing file 222 and PPU license manager 224 are in proper operational state, step 264. PPU licensing monitor 226 logs any error detected. Upon finished checking, PPU licensing monitor 226 sets a new trigger value, e.g. day, hour, and/or minute, for triggering the next monitoring system integrity check event notification, step 266. In one embodiment, PPU licensing monitor 226 resets the trigger value to the next hour, to allow the monitoring system integrity check to be performed once every hour.

Figure 7:
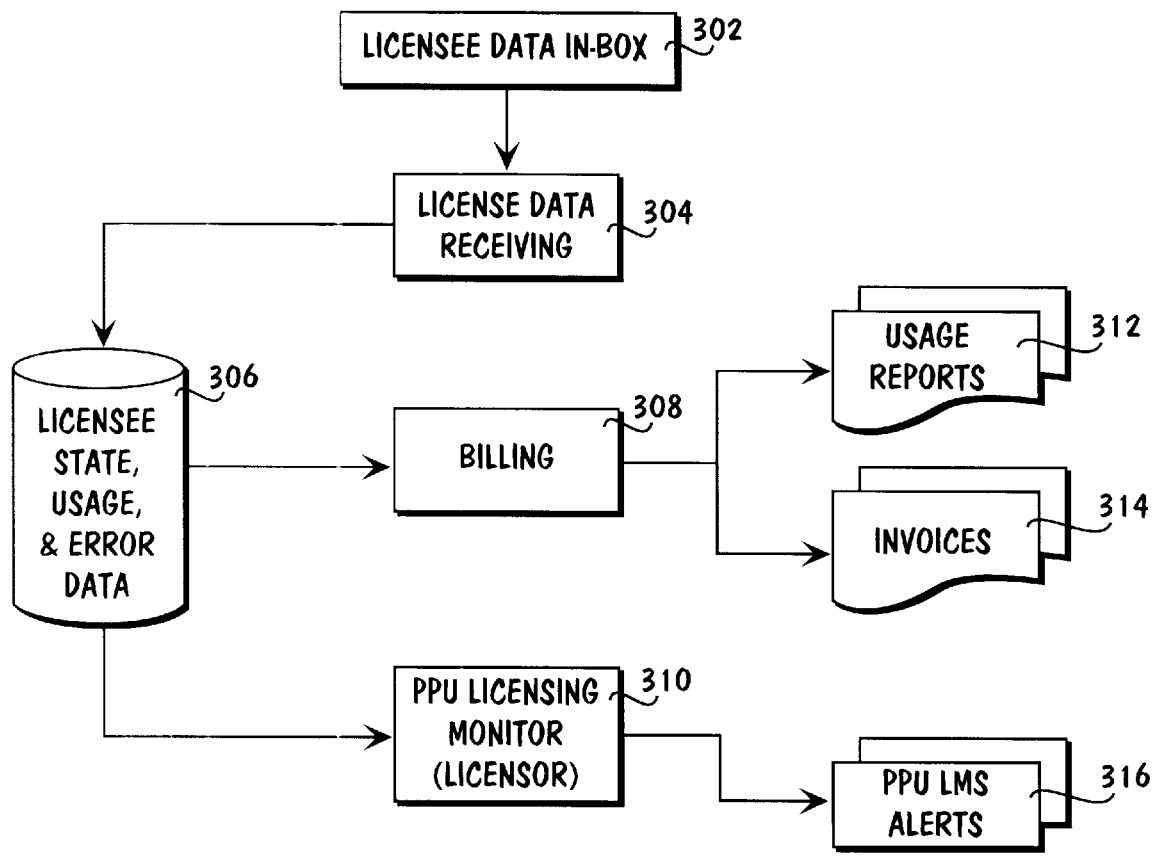
FIG. 7 illustrates one embodiment of a licensor LMS.

Referring now to FIG. 7, wherein a block diagram illustrating one embodiment of a licensor LMS 300 is shown. As illustrated, licensor LMS 300 includes licensee data in-box 302, licensee data receiving module 304, licensee data database 306, billing module 308, and PPU licensing monitor 310. Licensee data in-box 302 operates to facilitate receipt of state and usage data from licensee LMS. Licensee data receiving module 304 operates to accept state and usage data deposited in licensee data in-box 302 by licensee LMS, and store them in licensee data database 306. As its name suggests, licensee data database 306 operates to hold the accepted licensee state and usage data. Billing module 308 operates to process the stored usage data to generate usage reports 312 and/or invoices 314 for the licensees. In one embodiment, usage reports 312 and/or invoices 314 are forwarded to the licensees electronically. In an alternate embodiment, usage reports 312 and/or invoices 314 are forwarded to the licensees in conventional communication means, such as postal service. Lastly, PPU licensing monitor 310 operates to process the stored state data, i.e. the "check-in" and error data, and generates alerts 316 for an administrator of the licensor. In one embodiment, alerts 316 are forwarded to the licensees electronically. In an alternate embodiment, alerts 316 are forwarded to the administrator of the licensor in other conventional communication means.

Figure 8:
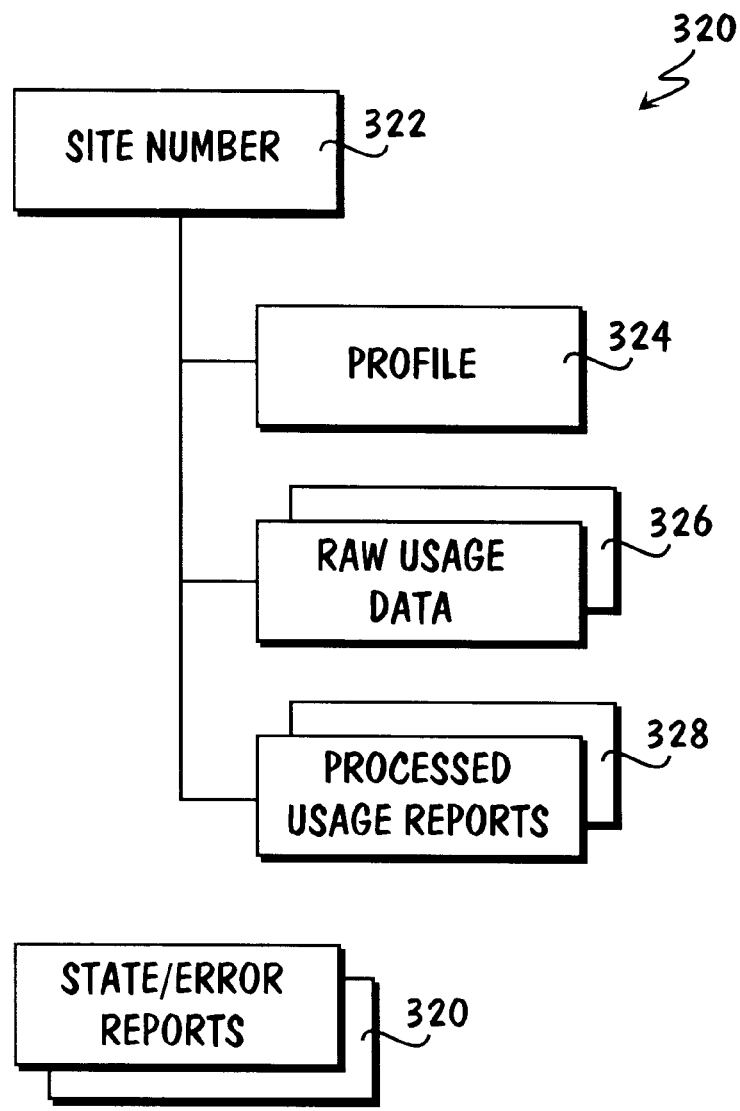
FIG. 8 illustrates one embodiment of the licensee state and usage data of FIG. 7.
Figure 9:
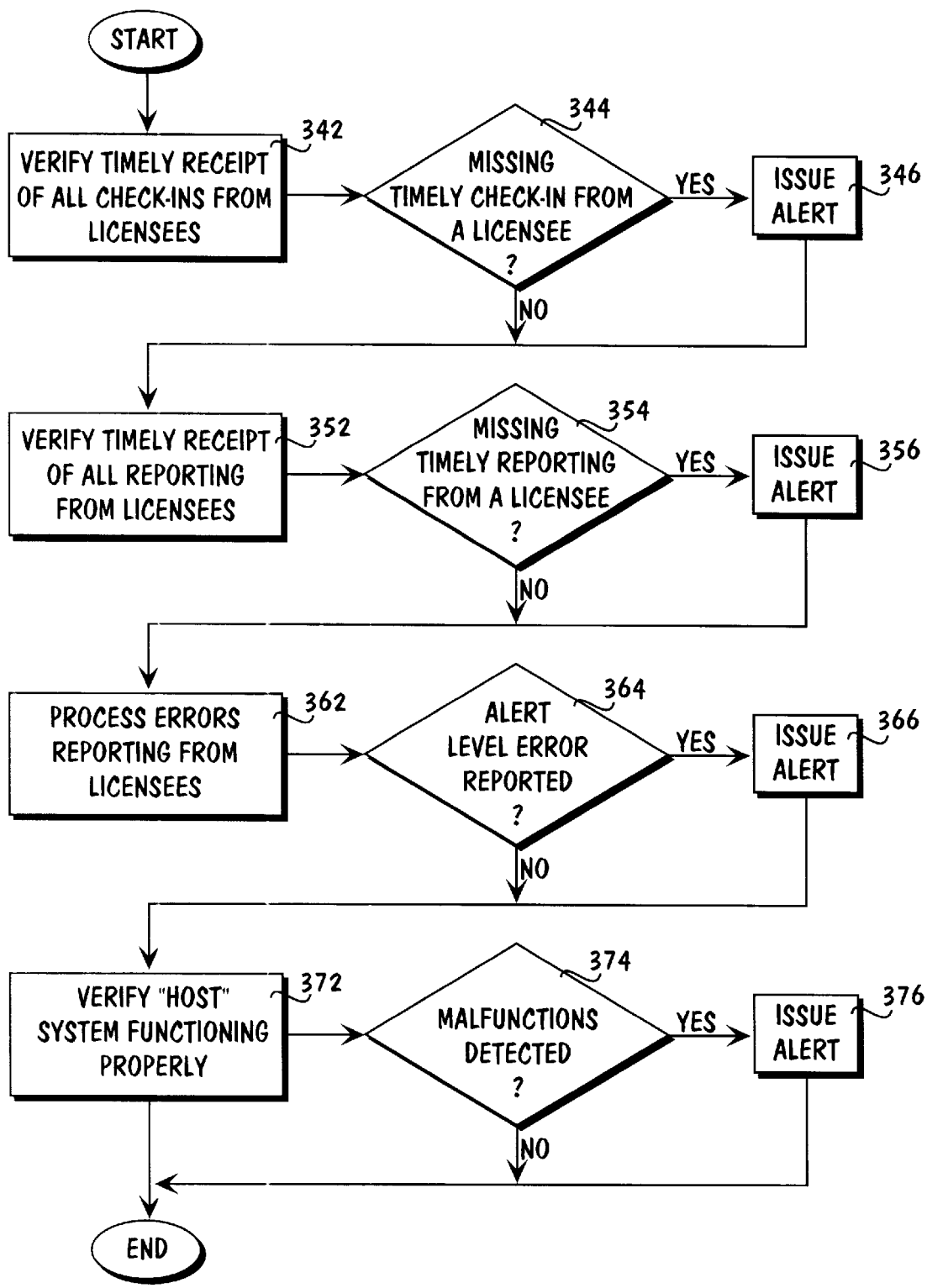
FIG. 9 illustrates one embodiment of the operational flow of the PPU licensing monitor of FIG. 7.

Licensee data in-box 302 and licensee data receiving module 304 may be implemented in any one of a number of approaches known in the art. One embodiment of licensee data database 306 is illustrated in FIG. 8. For the illustrated embodiment, licensee data database 306 stores the licensee data by licensee data structures 320. Each licensee data structure 320 includes licensee number 322, a profile of the licensee 324, raw usage data 326 and processed usage reports 328. For the illustrated embodiment, the state and error reports 330 are stored separately. Examples of profile information include mailing address, phone number, etc. Similarly, billing module 308, usage reports 312 and invoices 314 may be implemented in any one of a number of approaches known in the art. One embodiment of the operational flow of PPU licensing monitor 310 is illustrated in FIG. 9, to be described more fully below. Lastly, alerts 316 may also be implemented in any one of a number of approaches known in the art.

Turning now to FIG. 9, upon invocation, PPU licensing monitor 310 verifies whether all licensee LMS have checked in as expected, i.e. in a timely manner, step 342. If all licensee LMS have checked in as expected, PPU licensing monitor 310 proceeds to step 352, otherwise, PPU licensing monitor 310 issues the appropriate alerts for the administrator, step 346, before proceeding to step 352. At step 352, PPU licensing monitor 310 verifies whether all licensee LMS have reported their usage data as expected, i.e. in a timely manner. If all licensee LMS have reported their usage data as expected, PPU licensing monitor 310 proceeds to step 362, otherwise, PPU licensing monitor 310 issues the appropriate alerts for the administrator, step 356, before proceeding to step 362.

At step 362, PPU licensing monitor 310 processes errors received from the licensee. If no alert level errors have been received, PPU licensing monitor 310 proceeds to step 372, otherwise, PPU licensing monitor 310 issues the appropriate alerts for the administrator, step 366, before proceeding to step 372. Finally, at step 372, PPU licensing monitor 310 verifies whether the licensor LMS is operating properly. Again, the verification may be performed in any one of a number of approaches known in the art. If the licensor LMS is operating properly, PPU licensing monitor 310 stops, otherwise, PPU licensing monitor 310 issues the appropriate alerts for the administrator, step 376, before stopping. In one embodiment, PPU licensing monitor 310 is automatically executed once per day.

Figure 10:
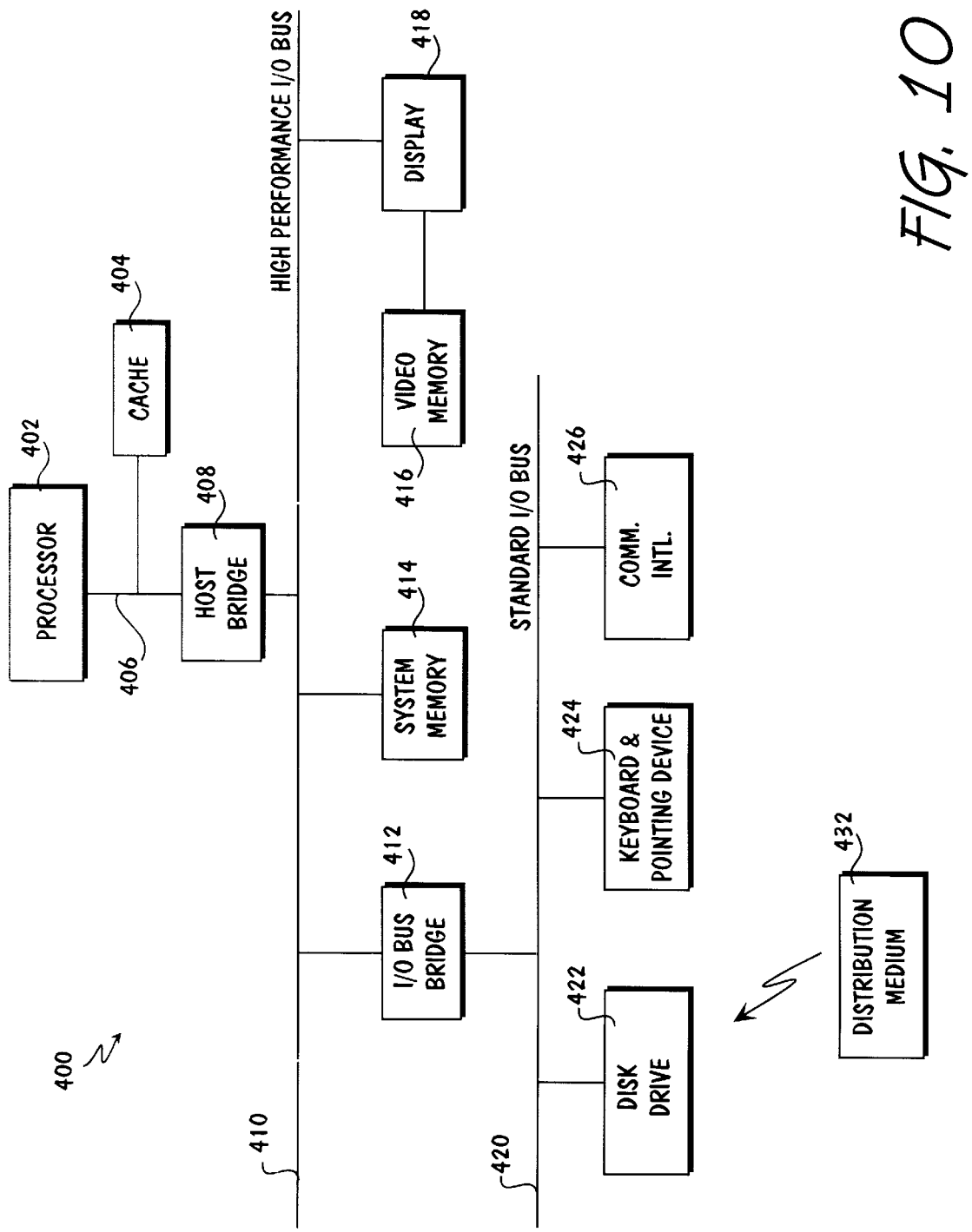
FIG. 10 illustrates one embodiment of a computer system suitable for programming with instructions implementing either the licensee LMS or the licensor LMS.

FIG. 10 illustrates one embodiment of a computer system suitable to be programmed with either the licensee LMS or the licensor LMS to practice the present invention. As shown, for the illustrated embodiment, computer 400 includes processor 402, processor bus 406, high performance I/O bus 410 and standard I/O bus 420. Processor bus 406 and high performance I/O bus 410 are bridged by host bridge 408, whereas I/O buses 410 and 412 are bridged by I/O bus bridge 412. Coupled to processor bus 406 is cache 404. Coupled to high performance I/O bus 410 are system memory 414 and video memory 416, against which video display 418 is coupled. Coupled to standard I/O bus 420 are disk drive 422, keyboard and pointing device 424, and communication interface 426.

These elements perform their conventional functions known in the art. In particular, disk drive 422 and system memory 414 are used to store permanent and working copies of the licensee/licensor LMS. The permanent copies may be pre-loaded into disk drive 422 in factory, loaded from distribution medium 432, or down loaded from a remote distribution source (not shown). The constitutions of these elements are known. Any one of a number of implementations of these elements known in the art may be used to form computer system 400.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a software PPU licensing system has been described.

What is claimed is:

1. An apparatus comprising:
    a) a storage medium having stored therein a first and a second plurality of instructions; and
    b) an execution unit coupled to the storage medium to execute the first plurality of instructions to locally grant pay-per-use licenses for a plurality of locally executed software applications, including local data collection on amount of usage licenses granted, and to execute the second plurality of instructions to locally monitor operational states of the local pay-per-use license granting and data collection operations, including periodic reporting of locally observed/gathered state and usage license granted data to a remote licensor pay-per-use license management system.

2. The apparatus of claim 1, wherein the periodic reporting of locally observed/gathered state and use license granted data to a remote licensor pay-per-use license management system effectuated by the execution unit executing the second plurality of instructions includes periodic reporting of the local pay-per-use license granting and data collection operations are indeed being monitored.

3. The apparatus of claim 1, wherein the periodic reporting of locally observed/gathered state and use license granted data to a remote licensor pay-per-use license management system effectuated by the execution unit executing the second plurality of instructions includes periodic reporting of usage license granted data locally collected.

4. The apparatus of claim 1, wherein the periodic reporting of locally observed/gathered state and use license granted data to a remote licensor pay-per-use license management system effectuated by the execution unit executing the second plurality of instructions includes periodic reporting of error data locally collected.

5. The apparatus of claim 1, wherein the local granting of pay-per-use licenses for a plurality of software applications effectuated by the execution unit executing the first plurality of instructions includes locally granting authorized usage licenses responsive to requests from the locally executed software applications, which are submitted by the locally executed software applications responsive to user invocations of the locally executed software applications.

6. An apparatus comprising:
  a) a storage medium having stored therein a plurality of instructions; and
  b) an execution unit coupled to the storage medium to execute the instructions to receive, store and process remotely observed/gathered state and usage license granted data for a plurality of remotely executed software applications from a plurality of remote licensee pay-per-use license management systems that locally grant pay-per-use licenses for the remotely executed software applications, including verification of timely periodic reporting from the remote licensee pay-per-use license management systems.

7. The apparatus of claim 6, wherein the verification of timely periodic reporting from the remote licensee pay-per-use license management systems effectuated by the execution unit executing the instructions includes verification of timely periodic reporting of the remote pay-per-use license granting and data collection operations are indeed being locally monitored on the remote licensee pay-per-use license management systems.

8. The apparatus of claim 7, wherein the execution unit further executes the instructions to generate alerts if one or more of the remote licensee pay-per-use license management systems fails to report the remote pay-per-use license granting and data collection operations are indeed being remotely monitored on the remote licensee pay-per-use license management systems in a timely periodic manner.

9. The apparatus of claim 6, wherein the verification of timely periodic reporting from the remote licensee pay-per-use license management systems effectuated by the execution unit executing the instructions includes verification of timely periodic reporting of usage license granted data remotely collected.

10. The apparatus of claim 9, wherein the execution unit further executes the instructions to generate alerts if one or more of the remote licensee pay-per-use license management systems fails to report usage license granted data remotely collected in a timely periodic manner.

11. The apparatus of claim 6, wherein the receiving, storing and processing of remotely observed/gathered state and usage license granted data for a plurality of remotely executed software applications from a plurality of remote licensee pay-per-use license management systems effectuated by the execution unit executing the instructions includes receiving, storing and processing of usage license granted data remotely collected, and generation of usage and/or invoice reports based on the usage license granted data processed.

12. The apparatus of claim 6, wherein the receiving, storing and processing of remotely observed/gathered state and usage license granted data for a plurality of remotely executed software applications from a plurality of remote licensee pay-per-use license management systems effectuated by the execution unit executing the instructions includes receiving, storing and processing of error data remotely gathered, and generation of alerts responsive to the error data processed.

13. A storage medium having stored therein a first and a second plurality of instructions to be executed by a host processor, wherein when executed by the host processor, the first plurality of instructions locally grant pay-per-use licenses for a plurality of locally executed software applications, including data collection on amount of usage licenses locally granted, and the second plurality of instructions locally monitor operational states of the local pay-per-use license granting and data collection operations, including periodic reporting of locally observed/collected state and usage license granted data to a remote licensor pay-per-use license management system.

14. The storage medium of claim 13, wherein the periodic reporting of locally observed/gathered state and usage license granted data to a remote licensor pay-per-use license management system performed by the second plurality of instructions includes periodic reporting of the local pay-per-use license granting and data collection operations are indeed being locally monitored.

15. The storage medium of claim 13, wherein the periodic reporting of locally observed/gathered state and usage license granted data to a remote licensor pay-per-use license management system performed by the second plurality of instructions includes periodic reporting of usage license granted data locally collected.

16. The storage medium of claim 13, wherein the periodic reporting of locally observed/gathered state and usage license granted data to a remote licensor pay-per-use license management system performed by the second plurality of instructions includes periodic reporting of error data locally collected.

17. The storage medium of claim 13, wherein the local granting of pay-per-use licenses for a plurality of locally executed software applications performed by the first plurality of instructions includes locally granting authorized usage licenses responsive to requests from the locally executed software applications, which are submitted by the locally executed software applications responsive to user invocations of the locally executed software applications.

18. A storage medium having stored therein a plurality of instructions to be executed by a host processor, wherein when executed, the instructions receive, store and process remotely observed/gathered state and usage license granted data for a plurality of remotely executed software applications from a plurality of remote licensee pay-per-use license management systems that locally grants pay-per-use licenses for the remotely executed software applications, including verification of timely periodic reporting from the remote licensee pay-per-use license management systems.

19. The storage medium of claim 18, wherein the verification of timely periodic reporting from the remote licensee pay-per-use license management systems performed by the instructions includes verification of timely periodic reporting of the remote pay-per-use license granting and data collection operations are indeed being remotely monitored on the remote licensee pay-per-use license management systems.

20. The storage medium of claim 19, wherein the instructions further generate alerts if one or more of the remote licensee pay-per-use license management systems fails to report the remote pay-per-use license granting and data collection operations are indeed being remotely monitored on the remote licensee pay-per-use license management systems in a timely periodic manner.

21. The storage medium of claim 18, wherein the verification of timely periodic reporting from the remote licensee pay-per-use license management systems performed by the instructions includes verification of timely periodic reporting of usage license granted data remotely collected.

22. The storage medium of claim 21, wherein the instructions further generate alerts if one or more of the remote licensee pay-per-use license management systems failed to report usage license granted data remotely collected in a timely periodic manner.

23. The storage medium of claim 18, wherein the receiving, storing and processing of remotely observed/gathered state and usage license granted data for a plurality of remotely executed software applications from a plurality of remote licensee pay-per-use license management systems performed by the instructions includes receiving, storing and processing of usage license granted data remotely collected, and generation of usage and/or invoice reports based on the usage license granted data processed.

24. The storage medium of claim 18, wherein the receiving, storing and processing of remotely observed/gathered state and usage license granted data for a plurality of remotely executed software applications from a plurality of remote licensee pay-per-use license management systems performed by the instructions includes receiving, storing and processing of error data remotely collected, and generation of alerts responsive to the error data processed.

25. In a system, a method of operation, comprising:
   (a) locally granting pay-per-use licenses for a plurality of software applications, including locally collecting data on amount of usage licenses granted; and
   (b) locally monitoring operational states of the local pay-per-use license granting and data collection operations, including periodic reporting of locally observed/gathered state and usage license granted data to a remote licensor pay-per-use license management system.

26. In a system, a method of operation, comprising:
   (a) receiving, storing and processing remotely observed/gathered state and usage license granted data for a plurality of remotely executed software applications from a plurality of remote co-resident licensee pay-per-use license management systems that locally grant pay-per-use licenses for the remotely executed software application; and
   (b) periodically verifying timely reporting by the remote licensee pay-per-use license management systems.

27. The method of claim 26, wherein the method further comprises:
   (c) generating alerts if one or more of the remote licensee pay-per-use license management systems fails to meet one or more periodic reporting criteria.

\* \* \* \* \*